(12) United States Patent  (10) Patent No.: US 9,150,266 B1
Jones  (45) Date of Patent: Oct. 6, 2015

(54) LATERALLY OSCILLATING MOTORCYCLE HEADLIGHT ASSEMBLY

(71) Applicant: Paul V. Jones, Levittown, PA (US)

(72) Inventor: Paul V. Jones, Levittown, PA (US)

( * ) Notice: Subject to any disclaimer, the term of this patent is extended or adjusted under 35 U.S.C. 154(b) by 0 days.

(21) Appl. No.: 14/256,064

(22) Filed: Apr. 18, 2014

(51) Int. Cl.
*B62J 6/02* (2006.01)
*F21V 33/00* (2006.01)

(52) U.S. Cl.
CPC .......................................... *B62J 6/02* (2013.01)

(58) Field of Classification Search
CPC ........................................................... B62J 6/02
USPC ........................... 362/464–468, 473, 475–476
See application file for complete search history.

(56) References Cited

U.S. PATENT DOCUMENTS

| 2,666,193 | A |   | 1/1954  | Keegan |
| 3,751,659 | A | * | 8/1973  | Nordberg ....................... 362/515 |
| 3,922,031 | A | * | 11/1975 | Hugon .......................... 296/78.1 |
| 3,939,339 | A |   | 2/1976  | Alphen |
| 7,556,410 | B2 |  | 7/2009  | Nakano et al. |

* cited by examiner

*Primary Examiner* — Sean Gramling
(74) *Attorney, Agent, or Firm* — LaHorte & Associates, P.C

(57) ABSTRACT

An oscillating headlight assembly for a motorcycle. A light assemblage is provided that contains a light source, wherein the light source produces a beam of light. At least one pivot pin couples the light assemblage to the motorcycle. A drive wheel is provided that is rotated by an electric motor. A linkage is attached to the drive wheel at an eccentric point. The linkage engages said light assemblage. When the drive wheel is rotated by the electric motor, the linkage causes the light assemblage to oscillate about the pivot pins through a range of motion. The result is a head light with a beam of light that sweeps back and forth while the motorcycle is in operation. This makes the motorcycle much more visible to other vehicles that share the road.

16 Claims, 3 Drawing Sheets

LATERALLY OSCILLATING MOTORCYCLE HEADLIGHT ASSEMBLY

BACKGROUND OF THE INVENTION

1. Field of the Invention

In general, the present invention relates to headlight assemblies for motor vehicles. More particularly, the present invention relates to headlight assemblies that enable the direction of the headlight to selectively move relative the direction in which the motor vehicle is driving.

2. Prior Art Description

A disproportionate number of motor vehicle accidents involve motorcycles. One of the largest contributing factors to this high accident rate is that motorcycles have a much smaller visual profile than do other vehicles on the road. Since motorcycles are relatively small and thin, they can easily be obstructed by other vehicles and roadside objects. Furthermore, the small visual profile of a motorcycle makes the motorcycle very easy to miss in the blind spots of larger vehicles. This difficulty in visually detecting motorcycles is compounded by the speed and agility of motorcycles. As such, to larger vehicles, motorcycles seem to come out of nowhere on the road.

To increase the visibility of a motorcycle, a motorcycle is required to have lights if that motorcycle is registered to ride on public roads. However, most motorcycles only have a single headlight. At night, a single headlight presents only a single point of light on a dark roadway. It is very difficult for an oncoming motorist to accurately judge the distance of the motorcycle just by viewing that single point of light.

It is for these reasons that motorcycle manufacturers intentionally design their motorcycles to be loud. The loudness of the motorcycle is intended to provide an audible warning of the motorcycle's presence to other vehicles on the road. However, many automobiles, especially luxury automobiles, are designed to shield out external noises. Furthermore, many automobiles contain powerful sound systems that block external noises.

One way to make a motorcycle more noticeable to other vehicles is to make the lighting of the motorcycle more noticeable. Flashing lights cannot be used because other vehicles perceive flashing lights to be an emergency vehicle. Larger, more widely spaced lights are likewise unusable due to the space limitations of a motorcycle. Consequently, one of the few options to make the lights of a motorcycle more noticeable is to cause the lights to oscillate in direction independent from the movement of the motorcycle.

Trains have some of the same perception problems as do motorcycles. A train typically has a single front headlight. This makes the distance of an approaching train hard to determine. In the prior art, the headlight for a train has been made to oscillate in position. The oscillation is in the vertical plane, wherein the headlight oscillates up and down as the train travels along the tracks. The oscillation of the headlight helps observers visually determine the distance of the approaching train. Vertically oscillating headlights for trains are exemplified in U.S. Pat. No. 2,666,193 to Keegan.

In the prior art, headlights for motorcycles have also been made to move. However, the movement imparted to the headlight is typically utilized to keep the headlight pointed in the direction of travel as the motorcycles leans and turns. For example, in U.S. Pat. No. 3,939,339 to Alphen, a system is disclosed that moves the headlight of a motorcycle to compensate for the lean of a motorcycle during a turn. If the motorcycle is traveling straight, the headlight does not move. Likewise, in U.S. Pat. No. 7,556,410 to Nakano, a headlight system is disclosed where the headlight automatically moves in the direction that a motorcycle is about to turn. If the motorcycle is traveling straight, then the headlight does not move. In both prior art examples, the position of the motorcycle headlight is altered to improve the visibility for the driver of the motorcycle. The movement of the headlight does nothing to improve the visibility of the motorcycle as perceived by other motorists, especially when the motorcycle is traveling straight.

A need therefore exists for a motorcycle headlight assembly that oscillates in such a way that it significantly improves the visibility of the motorcycle at all times and helps other vehicles perceive the distance of the motorcycle on the road. This need is met by the present invention as described and claimed below.

SUMMARY OF THE INVENTION

The present invention is an oscillating headlight assembly for a motorcycle. A light assemblage is provided that contains a light source and a parabolic reflector. When activated, the light assemblage produces a beam of light that projects in front of the motorcycle at a predetermined angle of inclination.

Pivot pins couple the light assemblage to the steering column of the motorcycle. The light assemblage is free to pivot about the pivot pins. Accordingly, the direction of the beam of light emanating from the light assemblage moves through a lateral range of motion. However, the angle of inclination of the beam of light remains constant throughout the lateral range of motion.

The movement of the light assemblage is controlled by an oscillation mechanism. The oscillation mechanism contains a drive wheel that is rotated by an electric motor. A linkage is provided. The first end of the linkage is attached to the drive wheel at an eccentric point. The second end of the linkage engages the light assemblage. When the drive wheel is rotated by the electric motor, the linkage causes the light assemblage to oscillate about the pivot pin through a range of motion.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention headlight assembly can be embodied in many ways, the embodiment illustrated shows a simple, single beam headlight. This embodiment is selected for its simplicity of explanation and sets forth one of the best modes contemplated for the invention. The illustrated embodiment, however, is merely exemplary and should not be considered a limitation when interpreting the scope of the appended claims.

Figure 1:
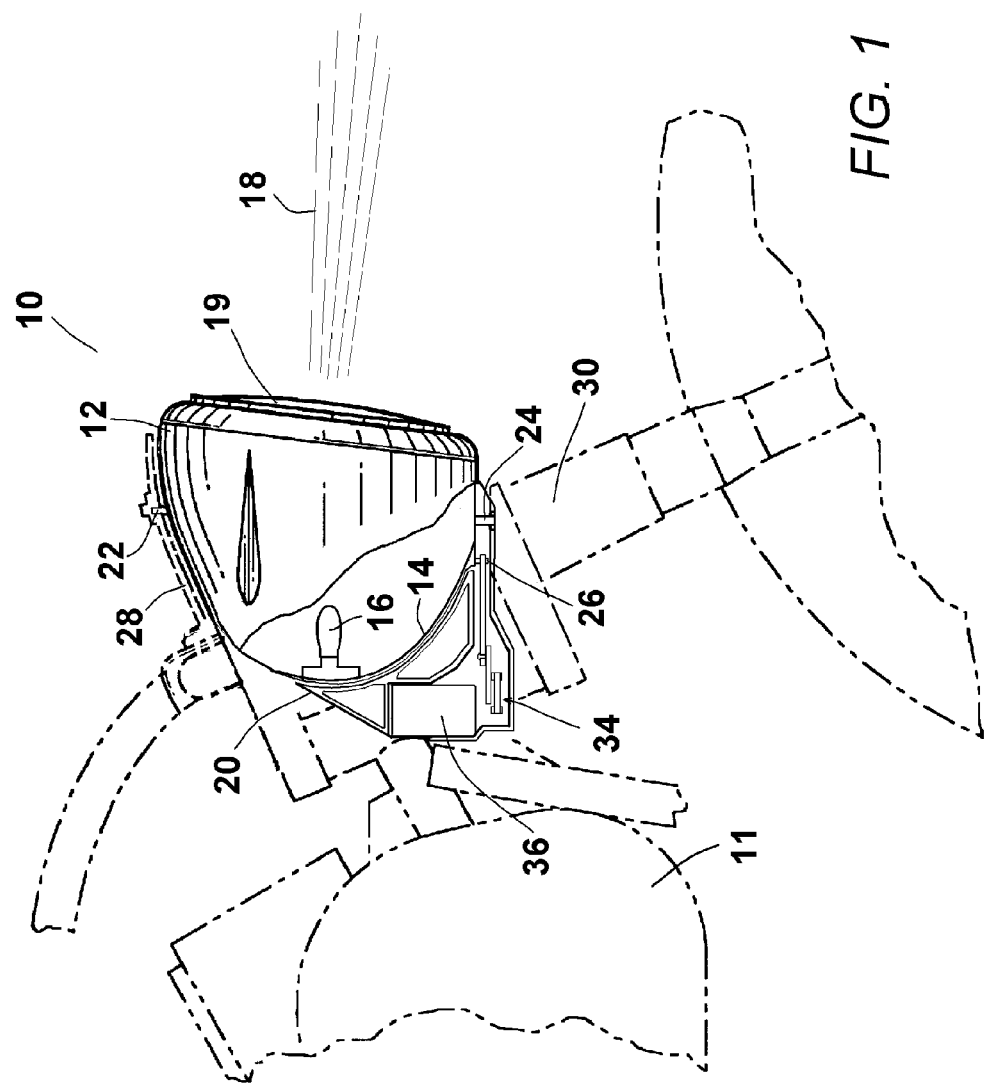
FIG. 1 is a fragmented view of a motorcycle showing an exemplary embodiment of a headlight assembly.
Figure 2:
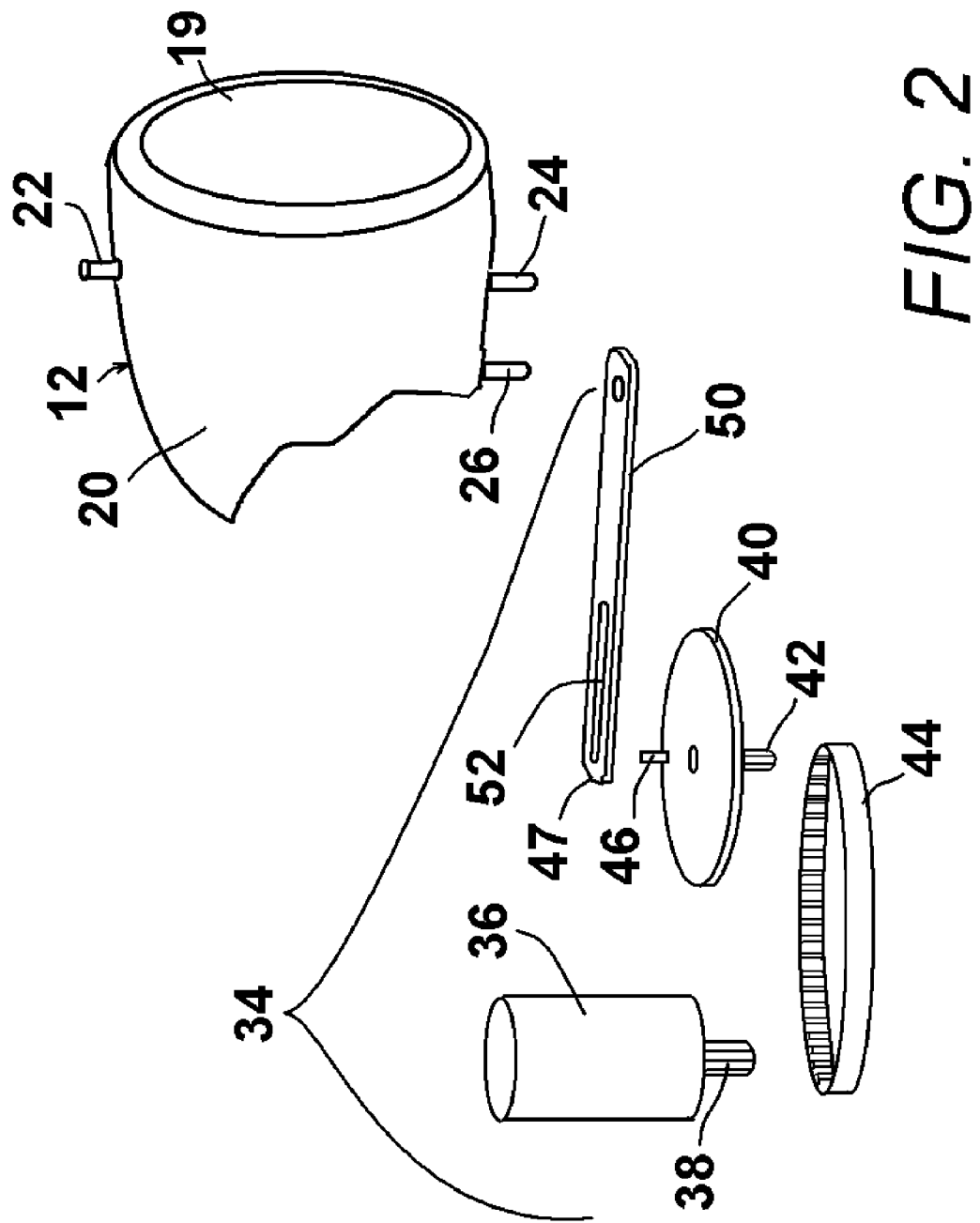
FIG. 2 is an exploded view of the oscillating mechanism used within the headlight assembly.

Referring to FIG. 1 in conjunction with FIG. 2, a headlight assemblage 10 for use on a motorcycle 11 is shown. The headlight assembly 10 includes a light assemblage 12, that acts as the headlight for the motorcycle 11. The light assemblage 12 contains a parabolic reflector 14. Within the parabolic reflector 14 is at least one light source 16. The light source 16 can be an incandescent bulb and/or an LED. The light source 16 produces a bright beam of light 18. The parabolic reflector 14 reflects the light forward and assists in collimating the light to project forward of the motorcycle 11. The beam of light 18 is directed through a transparent protective lens 19. The protective lens 19 may or may not produce focusing effects upon the beam of light 18. The light source 16, parabolic reflector 14, and protective lens 19 are all contained within an articulating housing 20 that shields the light source 16 and the parabolic reflector 14 from the elements. The articulating housing 20 can have many shapes and can be any color so as to compliment the aesthetics of the overall motorcycle 11.

The light assemblage 12 of the articulating housing 20 with its internal light source 16, parabolic reflector 14, and protective lens 19 has a center of gravity (CG). Two pivot posts 22, 24 extend from the articulated housing 20. The pivot posts 22, 24 include a top pivot post 22 and a bottom pivot post 24. Both the top pivot post 22 and the bottom pivot post 24 are linearly aligned with each other. The pivot posts 22, 24 are also linearly aligned near or through the center of gravity (CG). A handle pin 26 also extends from the articulating housing 20. The handle pin 26 extends downwardly from the articulated housing 20. However, the handle pin 26 is positioned near the rear of the light assemblage 12 and is not vertically aligned with its center of gravity (CG).

The motorcycle 11 has a steering column 30 that turns with the handlebars of the motorcycle 11. A top bracket 28 is mounted to the steering column 30 of the motorcycle 11. The top bracket 28 extends forward and supports a bearing 32. The bearing 32 receives the top pivot pin 22 of the articulating housing 20, while enabling the top pivot pin 22 and the underlying articulating housing 20 to rotate freely.

An oscillation mechanism 34 is mounted to the steering column 30 of the motorcycle 11. As such, it will be understood that the oscillation mechanism 34 turns with the steering column 30 as the motorcycle 11 is driven and steered. The oscillation mechanism 34 includes an electric motor 36. The electric motor 36 turns a drive pinion 38 when in operation. A drive wheel 40 is provided. The drive wheel 40 has a concentric slave pinion 42 extending downwardly from the center of the drive wheel 40. The slave pinion 42 and the drive pinion 38 are mechanically interconnected. In the shown illustration, the interconnection is made using a flexible drive belt 44. However, other gear-based interconnections can also be used. The use of a drive belt 44 is preferred because it allows for slippage and prevents the electric motor 36 from binding and becoming damaged should the articulating housing 20 ever be inhibited from movement by an obstruction.

When the electric motor 36 is in operation, the drive pinion 38 rotates. The drive pinion 38 moves the drive belt 44. The drive belt 44 rotates the slave pinion 42. The slave pinion 42 is affixed to the drive wheel 40, therein making the drive wheel 40 turn. A drive pin 46 extends upwardly from the top surface of the drive wheel 40 at a point that is eccentric from the center of rotation for the drive wheel 40. A linkage arm 50 is provided. The linkage arm 50 has a first end 47 and a second end 48. The first end 47 of the linkage arm 50 contains a slot 52. The slot 52 in the linkage arm 50 engages the drive pin 46 on the drive wheel 40. The drive pin 46 can reciprocally move within the slot 52, as the drive wheel 40 and linkage arm 50 experience relative movement. A hole 54 is formed in the second end 48 of the linkage arm 50. The hole 54 receives the handle pin 26 that extends below the articulating housing 20 of the light assemblage 12.

Figure 3:
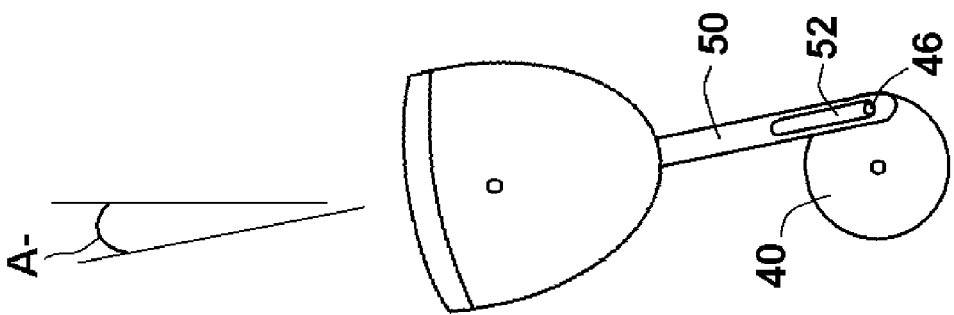
FIG. 3 is a top view of the headlight assembly turned laterally to the left.
Figure 4:
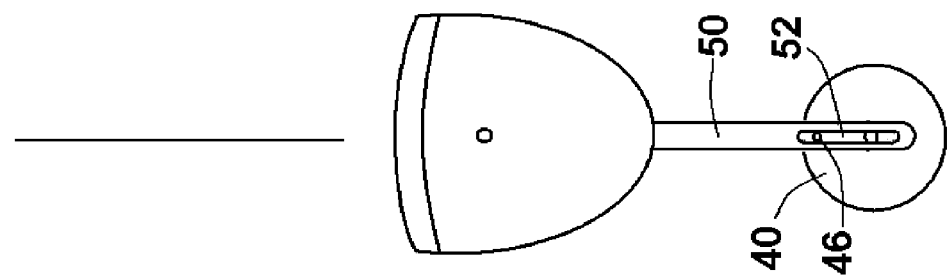
FIG. 4 is a top view of the headlight assembly pointing straight.
Figure 5:
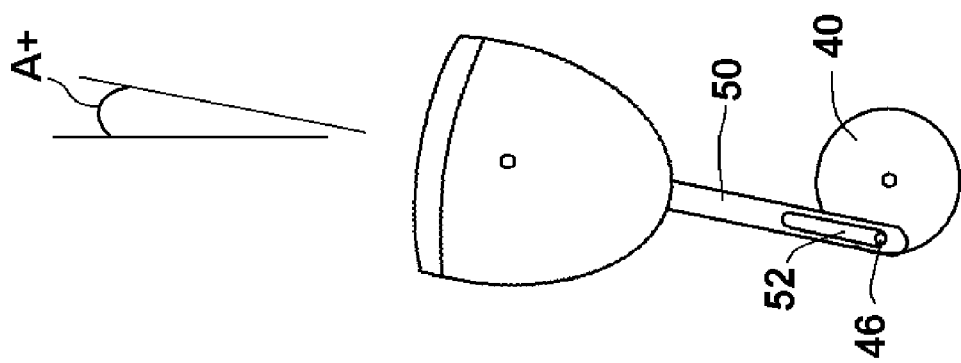
FIG. 5 is a top view of the headlight assembly turned laterally to the right.

Referring to FIG. 3, FIG. 4 and FIG. 5 in conjunction with FIG. 1 and FIG. 2, it will be understood that when in operation, the electric motor 36 is activated. The electric motor 36 turns the drive pinion 38. The drive pinion 38 turns the drive belt 44. The drive belt 44 turns the slave pinion 42. The slave pinion 42 turns the drive wheel 40. The drive wheel 40 moves the eccentric drive pin 46 along a circular path. The movement of the eccentric drive pin 46 translates movement to the linkage arm 50. The linkage arm 50 causes a reciprocating movement of the handle pin 26. The movement of the handle pin 26 causes the light assemblage 12 to move back and forth about the fulcrum of the pivot pins 22, 24. This causes the direction of the light assemblage 12 to alter relative to the steering column 30 of the motorcycle 11.

The light assemblage 12 produces a beam of light 18. When directed straight ahead, the beam of light 18 has a slight downward angle of inclination (A). This angle of inclination (A) is intended to illuminate the roadway up to one hundred feet in front of the motorcycle 11. As the light assemblage 12 moves back and forth to the left and right, the direction of the beam of light 18 emanating from the assemblage changes accordingly. The preferred range of movement is between 2 degrees and 6 degrees, on either side of center. Accordingly, the full arc of movement is preferably between 4 degrees and 12 degrees. Throughout the entire range of motion, the angle of inclination (A) of the beam of light 18 remains constant. That is, the beam of light moves laterally only to the left and right. There is no appreciable up and down motion imparted by the oscillation mechanism 34.

From the above, it will be understood that when the headlight assembly 10 is in operation, the beam of light 18 moves laterally back and forth. The back and forth movement occurs relative the steering column 30 and is not dependent upon the orientation of the steering column 30. Accordingly, the beam of light 18 oscillates back and forth both while the motorcycle 11 is driving straight and when the motorcycle 11 is turning.

The oscillation rate at which the light assemblage 12 moves is determined by the motorcycle manufacturer. The preferred oscillation rate is between forty and one-hundred oscillations per minute. It is preferred that the electric motor 36 be a constant speed motor. Changes in the oscillation rate can therefore be made by altering the eccentric position of the drive pin 46 on the drive wheel 40, or altering the ratio of diameters between the drive pinion 38 and the slave pinion 42.

The oscillations of the light assemblage 12 are created by the electric motor 36. The electric motor 36 is preferably activated upon the starting of the motorcycle's engine. Accordingly, the oscillations in the beam of light 18 occur even when the running motorcycle 11 is standing at rest. As the motorcycle 11 drives along roads, other vehicles in front of the motorcycle 11 will see the beam of light 18 moving back and forth. This movement is highly perceivable to the human eye and therefore makes the motorcycle 11 much easier to notice. Furthermore, by oscillating the beam of light 18 back and forth, an observer in front of the motorcycle 11 can much more accurately visualize the distance between himself/herself and the approaching motorcycle 11. This improved depth perception helps prevent accidents between motorcycles and other vehicles caused by misjudging the distance of the motorcycle.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. An oscillating headlight assembly for a motorcycle, comprising:
   a light assemblage containing a light source, wherein said light source produces a beam of light that emanates from said light assemblage;
   at least one pivot pin that couples said light assemblage to said motorcycle, wherein said light assemblage can pivot about said at least one pivot pin relative said motorcycle;
   an electric motor that turns a drive pinion;
   a drive wheel having a slave pinion extending therefrom, wherein said drive pinion and said slave pinion are mechanically interconnected so that rotational movement is transferred from said drive pinion to said slave pinion, therein causing said drive wheel to be rotated by said electric motor;
   a linkage having a first end and a second end, wherein said first end is attached to said drive wheel at an eccentric point, wherein said second end of said linkage engages said light assemblage, and wherein when said drive wheel is rotated by said electric motor, and said linkage causes said light assemblage to oscillate about said pivot pin through a range of motion.

2. The assembly according to claim 1, wherein said at least one pivot pin includes a first pivot pin and a second pivot pin extending from opposites sides of said light assemblage, wherein said first pin and said second pin are linearly aligned.

3. The assembly according to claim 2, wherein said light assemblage has a center of gravity, and wherein said first pin and said second pin are vertically aligned with said center of gravity.

4. The assembly according to claim 1, wherein said linkage is connected to said light assemblage with a pivot connection.

5. The assembly according to claim 1, wherein said range of motion is between four degrees and twelve degrees.

6. The assembly according to claim 1, wherein said drive pinion is joined to said slave pinion with a flexible belt.

7. The assembly according to claim 1, wherein said beam of light emanates from said light assemblage at a first angle of inclination relative a horizontal plane, wherein said first angle of inclination is maintained as said light assemblage oscillates through said range of motion.

8. The assembly according to claim 1, wherein said light assemblage further includes a parabolic reflector.

9. A headlight assembly for a motorcycle, comprising;
   a headlight that projects a beam of light at a first angle of inclination relative a horizontal plane;
   an oscillation mechanism coupled to both said motorcycle and said headlight that physically oscillates said headlight back and forth through a range of motion while maintaining said first angle of inclination, said oscillation mechanism having a electric motor that turns a drive pinion, and a drive wheel with a slave pinion that extends from said drive wheel, wherein said drive pinion and said slave pinion are mechanically interconnected so that rotational movement is transferred from said drive pinion to said slave pinion, therein causing said drive wheel to be rotated by said electric motor.

10. The assembly according to claim 9 wherein said motorcycle has a steering column and wherein said headlight and said oscillation mechanism are both supported by said steering column.

11. The assembly according to claim 9, wherein said oscillation mechanism oscillates said headlight through said range of motion at a rate of between 40 times per minute and 100 times per minute.

12. The assembly according to claim 10, wherein said headlight includes at least one pivot pin that couples said headlight to said steering column, wherein said headlight can pivot about said at least one pivot pin relative said steering column.

13. The assembly according to claim 12, wherein said oscillation mechanism includes a linkage connected to said drive wheel at an eccentric point, wherein when said drive wheel is rotated by said electric motor, and said linkage causes said headlight to oscillate about said at least one pivot pin through a range of motion.

14. The assembly according to claim 9, wherein said at least one pivot pin includes a first pivot pin and a second pivot pin extending from opposites sides of said headlight, wherein said first pin and said second pin are linearly aligned.

15. The assembly according to claim 9, wherein said range of motion is between four degrees and twelve degrees.

16. The assembly according to claim 9, wherein said drive pinion is joined to said slave pinion with a flexible belt.

* * * * *